United States Patent [19]
Burwell

[11] Patent Number: 5,196,114
[45] Date of Patent: Mar. 23, 1993

[54] AEROBIC SEPTIC SYSTEM

[76] Inventor: Demcy L. Burwell, Rte. 8, Box 168, Lake Charles, La. 70605

[21] Appl. No.: 820,258

[22] Filed: Jan. 14, 1992

[51] Int. Cl.[5] ............................................. C02F 3/20
[52] U.S. Cl. .............................. 210/188; 210/195.3; 210/197; 210/218; 210/221.2
[58] Field of Search ............. 210/194, 197, 188, 218, 210/220, 221.1, 221.2, 603, 629, 916, 195.4, 195.3

[56] References Cited

U.S. PATENT DOCUMENTS

| | | | |
|---|---|---|---|
| 691,365 | 1/1902 | Dittler | 210/605 |
| 2,638,444 | 5/1953 | Kappe | 210/220 |
| 3,043,433 | 7/1962 | Singer | 210/221.1 |
| 3,133,017 | 5/1964 | Lambeth | 210/197 |
| 3,152,982 | 10/1964 | Pagnotti | 210/221.1 |
| 3,694,353 | 9/1972 | Young et al. | 210/197 |
| 3,819,054 | 6/1974 | Long et al. | 210/199 |
| 4,238,338 | 12/1980 | Kinzer | 210/220 |
| 4,263,143 | 4/1981 | Ebner et al. | 210/629 |
| 4,650,577 | 3/1987 | Hansel | 210/195.3 |
| 4,933,076 | 6/1990 | Oshima et al. | 210/629 |
| 4,983,285 | 1/1991 | Nolen | 210/197 |
| 5,032,276 | 7/1991 | Mackrie | 210/629 |

*Primary Examiner*—Stanley S. Silverman
*Assistant Examiner*—Christopher Upton
*Attorney, Agent, or Firm*—Richard C. Litman

[57] ABSTRACT

An aerobic septic system having a conventional tank, conical separator or clarifier, and air injection system has an air header discharging air around the entire periphery of the tank. Substantially all solids suspended in wastewater are therefore mechanically agitated and aerated, greatly increasing system efficiency. Wastewater rises along the tank walls and spills over the top of the separator. It then descends in the separator. A vent pipe has an egress port in the roof of the tank, and rises to join an incoming sewage line from a residential plumbing system, which in turn communicates with a vent stack.

2 Claims, 5 Drawing Sheets

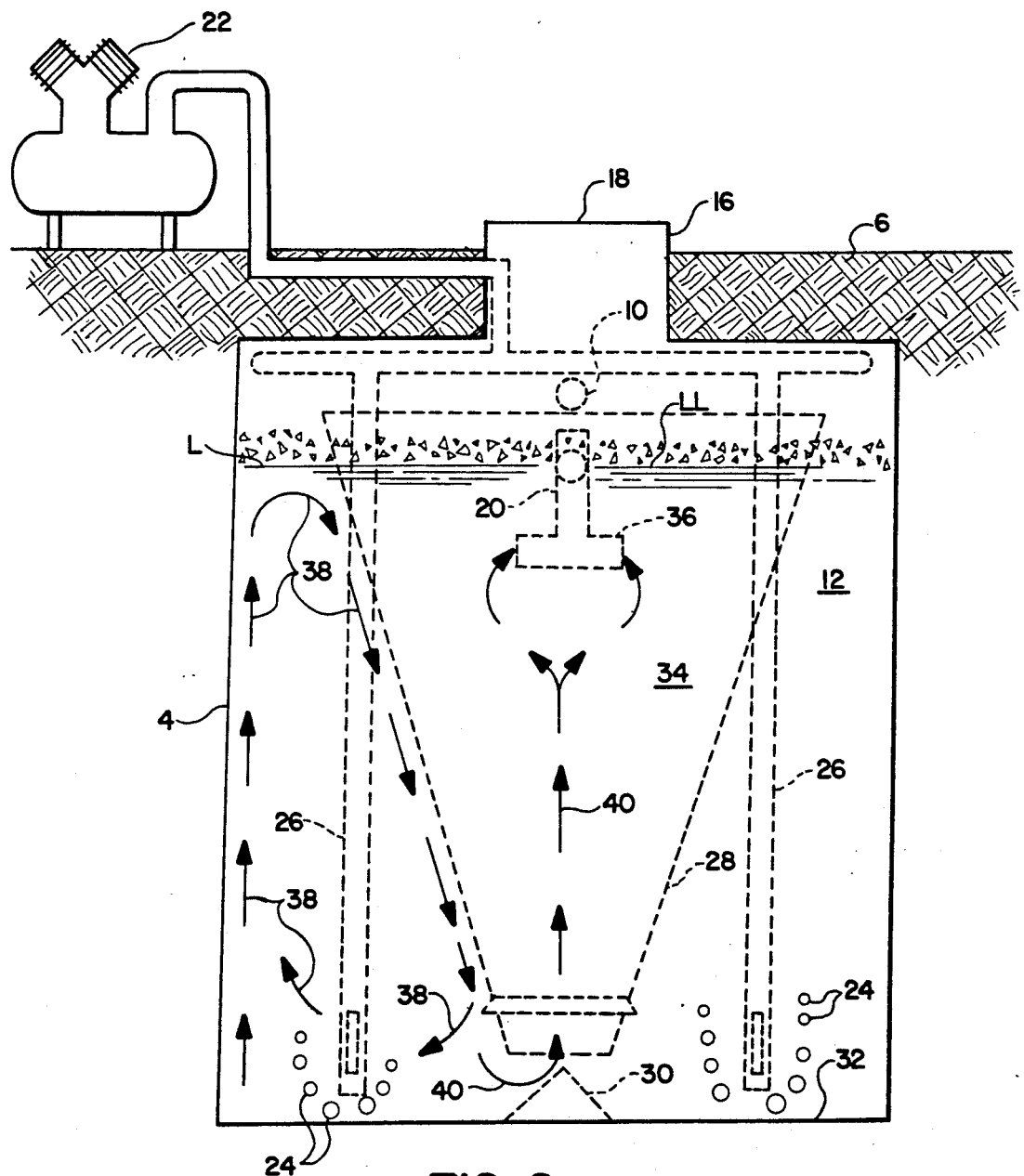
FIG. 6 — PRIOR ART

AEROBIC SEPTIC SYSTEM

FIELD OF THE INVENTION

The present invention relates to air injection type aerobic septic systems having liquid flow directors and solids separators.

DESCRIPTION OF THE PRIOR ART

Aerobic septic systems having injected air are known, as best exemplified by U.S. Pat. No. 4,650,577, issued on Mar. 17, 1987 to Bradley L. Hansel. Hansel provides a plurality of vertically disposed tubes, four being illustrated, discharging air from substantially a single point on each tube. A separator assumes the shape of a hollow cone and is centrally located within the tank. An annulus is defined between the tank walls and the separator. A wastewater flow circuit within this annulus is created in which water flows upwardly near the tank wall and downwardly at the wall of the separator.

U.S. Pat. No. 3,819,054, issued on Jun. 25, 1974 to Hubert G. Long et al., discloses a sewage treatment system having top venting to preclude build up of pressure from the air injection.

SUMMARY OF THE INVENTION

The present invention improves on aerobic, air injected septic systems having a tank and a separator by providing air discharge around the entire periphery of the tank. With substantially all the wastewater thus being contacted and lifted by the rising air, a strong current is induced in the wastewater. As the level of wastewater rises in response to being lifted by rising air bubbles, it overflows the wall of the separator, and flows thereinto. The wastewater then descends in the separator and flows toward a pointed conical flow director, and is then directed to repeat the cycle.

The combination of air to wastewater ratio and separation by the separator wall of upward and downward flows produces a rapid and thorough flow including substantially all wastewater present. Hansel's device does not produce as vigorous a flow pattern since the air is discharged at sufficiently few points around the periphery of the tank to permit formation of columns of rising bubbles, permitting much of the wastewater to part and passively allow the columns of bubbles to rise. Also, there is no mechanical barrier separating fluid currents in opposite directions, which opposing currents slow one another. Some wastewater and solid waste suspended therein avoid being caught up in the columnar current, some minor laminar flow notwithstanding. Waste and wastewater therefore experience fewer flow cycles in a given time period with equal tank size, water volume, and air injection.

At the same time, considerable turbulence is experienced by waste and wastewater in the flow scheme of the present invention. This results in increased mechanical agitation and disintegration of solids, as well as increased exposure to air. Increased disintegration and more flow cycles enhance disintegration by aerobic bacteria.

The combination of these forces greatly improves the efficiency of the aerobic septic system. Experience has shown that an operating period of twelve hours will treat 500 gallons of ordinary residential wastewater to the extent that effluent is clear and within ordinary municipal standards for environmental discharge, and that there is so little residual solid that the usual scum blanket is not formed.

Accordingly, an object of the present invention is to provide an aerobic septic system subjecting substantially all wastewater to contact with injected air.

Another object is to provide mechanical separation of opposing fluid currents within a septic tank.

Still another object is to provide an air header subjecting substantially all wastewater and waste to contact with injected air.

A further object is to provide an aerobic septic system wherein fluid communicates between the tank and a smaller receptacle contained therein only by action of injected air.

A still further object is to provide an aerobic septic system wherein communication between the tank and a smaller receptacle contained therein is caused by rising liquid level effected by action of injected air.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 6 is a cross sectional side view of a prior art aerobic septic system.

Similar reference characters denote corresponding features consistently throughout the attached drawings.

DETAILED DESCRIPTION OF THE PREFERRED EMBODIMENTS

Figure 1:
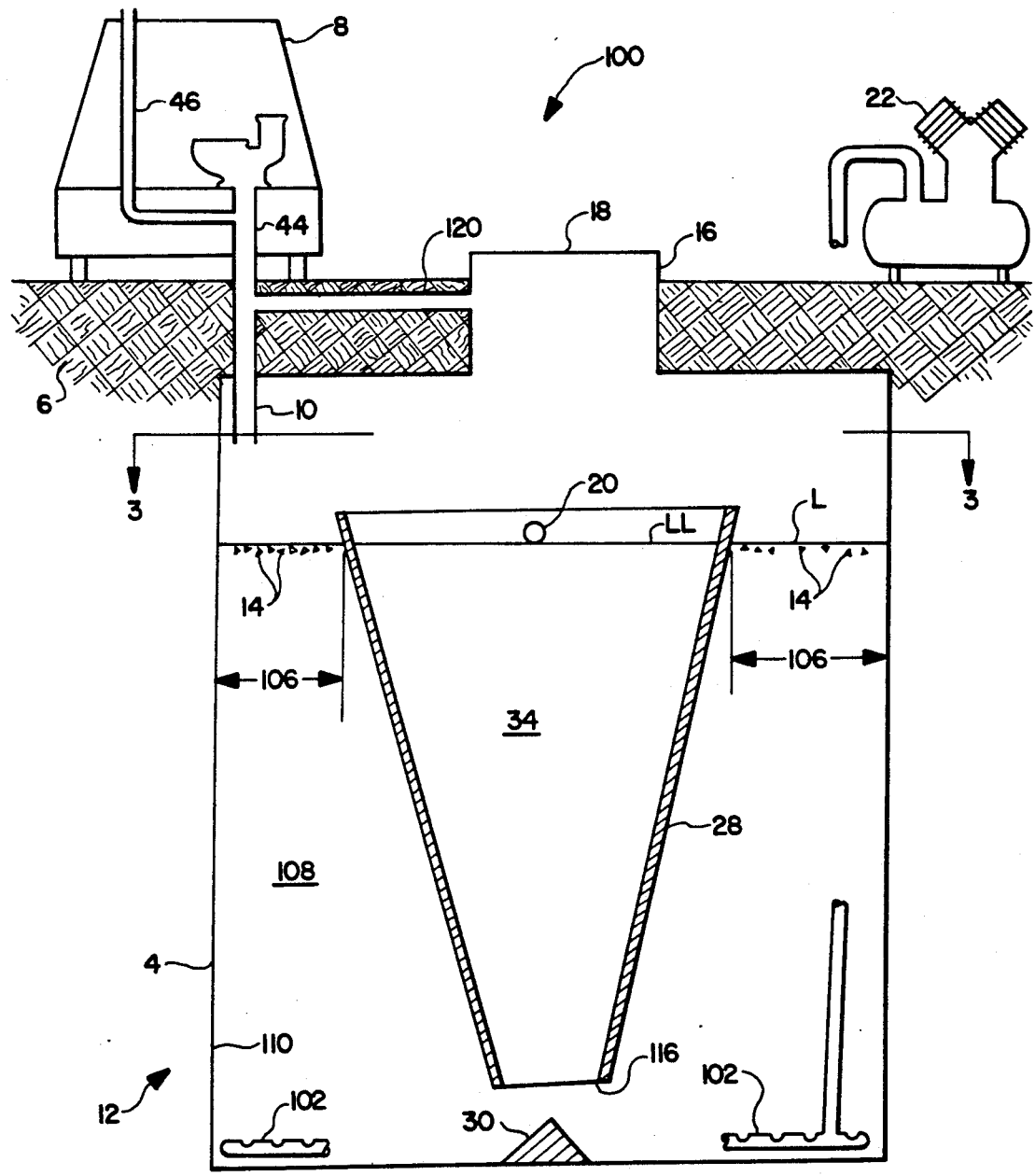
FIG. 1 is a cross sectional side view of the aerobic septic system of the present invention under static conditions.
Figure 3:
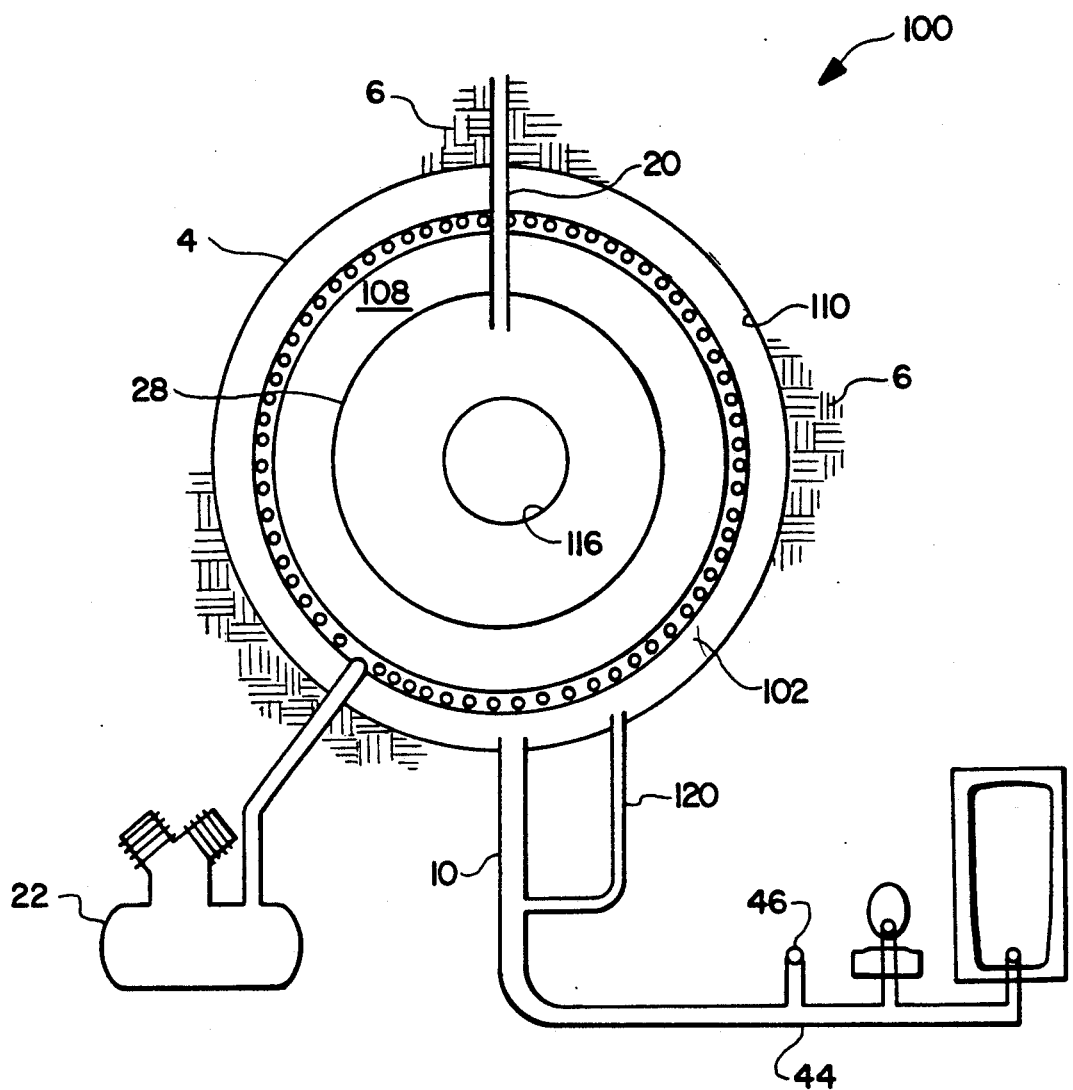
FIG. 3 is a top plan view partial schematic representation of the aerobic septic system of the present invention in its environment, with the tank viewed generally along line 3—3 of FIG. 1.
Figure 4:
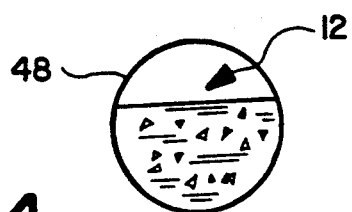
FIG. 4 is a cross sectional detail view of a wastewater line.

The present invention is seen in FIGS. 1 and 3 to improve on a prior art aerobic septic system 2 illustrated in FIG. 6 by modifying an air header 102 to extend along the entire periphery of the septic tank 4 and discharging air continuously therealong.

General construction of the aerobic septic system 100 of the present invention is similar in many respects to the septic system 2 of the prior art. In both cases, a tank 4 is buried in the ground 6 near a residence 8. A wastewater line 10 carries wastewater 12 containing suspended solid waste 14 from the residence 8 to the septic system 2 or 100 as solid waste 14 is generated by household use, where the suspended solid waste 14 pours into wastewater 12 standing in the tank 4. A projection 16 of the tank 4 conventionally includes a removable cover 18 for inspection and servicing.

Due to the level of a water discharge line 20 serving to drain the tank 4, standing wastewater 12 will collect and remain in the tank 4 at a level L below the discharge line 20. Wastewater 12 drained from the tank 4 through the discharge line 20 may be released as partially treated water to the ground 6 for natural dissipation, or may be collected for further treatment, as would occur for immediate household reuse.

When an air compressor 22 or other source of air activates (the air compressor 22 or other source of air being understood to include necessary conduits), air 24 is injected into the standing wastewater 12. The air 24 bubbles upwardly through the wastewater 12, oxygenating the wastewater 12, causing a certain degree of turbulence, and inducing flow within the tank 4.

As seen in FIG. 6, air 24 is injected through a plurality of vertically disposed pipes 26, the flow pattern claimed by Hansel being generally indicated by arrows 38. A cyclic flow pattern is established, with a small flow 40 of treated water being drawn into a hollow conical separator 28. Flow 40 into the separator is enhanced by a conical director 30 on the floor 32 of the tank 4. A chamber 34 generally defined within the separator 28 and below the top surface L of standing wastewater 12 communicates with the discharge line 20 by collector pipes 36 opening into the chamber 34 below the water top surface LL.

Figure 2:
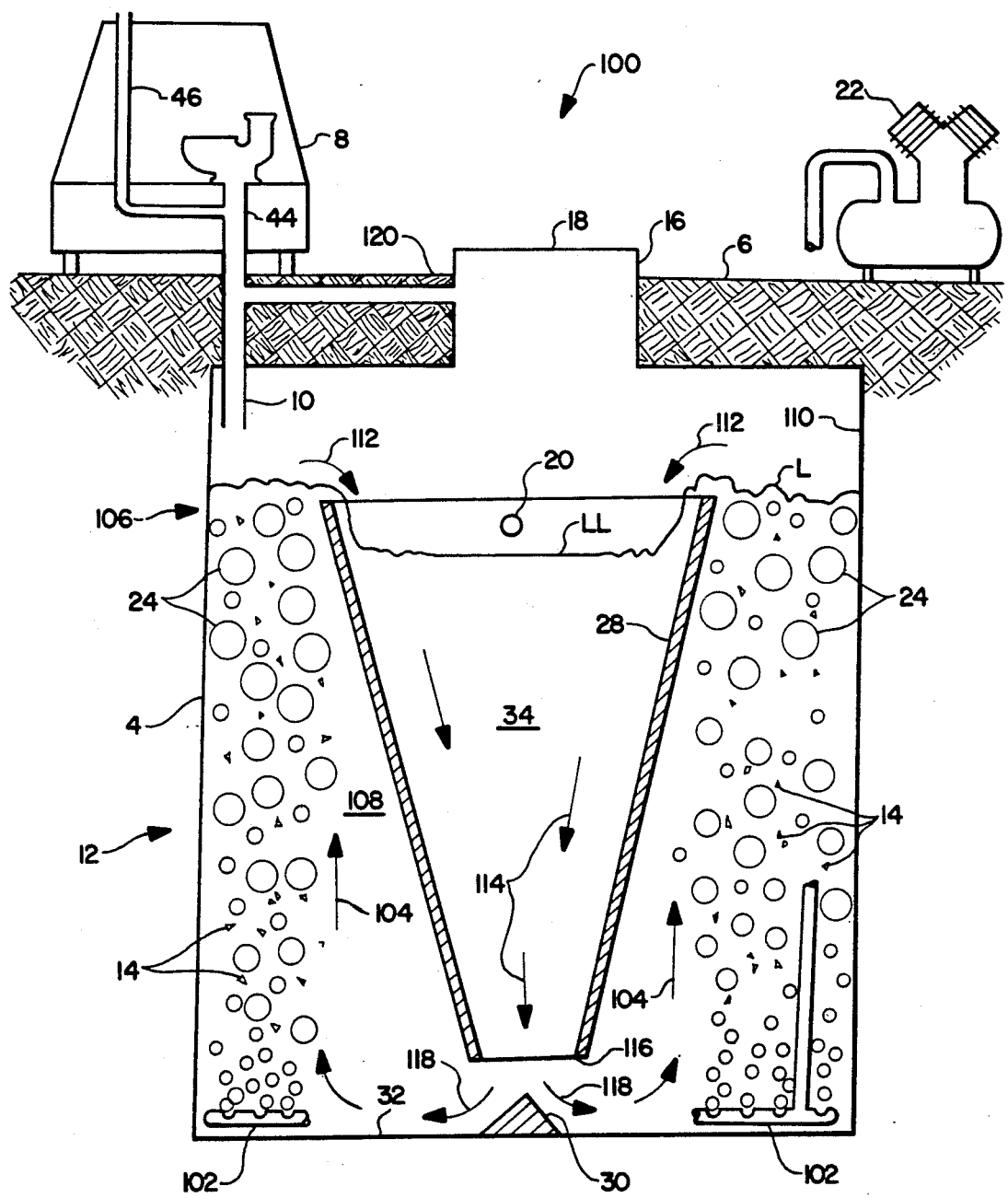
FIG. 2 is a cross sectional side view of the aerobic septic system of the present invention during air injection.

In the present invention, as shown in FIGS. 2 and 3, the air header 102 discharging air 24 into the standing wastewater 12 in the present invention provides increased effectiveness by releasing a continuous curtain of air 24 in the form of bubbles. This improvement results in a vastly different wastewater flow pattern within the tank 4 compared to the prior art system 2 of FIG. 6.

The wastewater flow pattern of the present invention, as will be seen in FIG. 2, induces a strong upwards current, generally indicated by arrows 104, due to air buoyancy. The continuous air curtain, which is better understood with reference to the air header 102 as seen in FIG. 3, concentrates at the narrowest point 106 of an annulus 108 defined between the tank vertical walls 110 and the separator 28. Since it is possible to build a septic tank 4 or a separator 28 in a configuration other than annular, the term "annulus" will be understood to encompass the space or gap shown as 108 in FIG. 1 regardless of the configuration thereof.

The narrowest point 106 of the annulus 108 coincides with the top surface LL of wastewater 12 contained in the annulus 108, as illustrated in FIGS. 1 and 2. Again referring to FIG. 2, the force of air buoyancy concentrated at the narrowest point 106 effectively lifts wastewater 12 and solid waste 14, thus raising the water level L in the annulus 108 until wastewater 12 overflows the separator 28, indicated by arrows 112.

Wastewater 12 then descends as indicated by arrows 114 in the separator 28 due to evacuation of wastewater 12 from the bottom orifice 116 of the separator 28 as the wastewater 12 is drawn into the upward current in the annulus 108, indicated by arrows 104. The same flow director 30 is used, but with wastewater 12 flowing back towards the annulus 108 in the opposite direction as in the prior art. The flow at this point as a new cycle is started is indicated by arrows 118.

It will be seen, then, that a cyclic water flow pattern is created in the septic system 100 of the present invention. The flow pattern is more efficient since upward and downward currents 104, 114 are segregated by the separator 28. Also, there is no division of a current flow into two diverging currents 38,40 (as shown in the prior art system of FIG. 6). The water flow pattern of the present invention is improved in that substantially all of the wastewater 12 sitting in the annulus 108, and not merely that portion of wastewater 12 being proximate to the rising column of air bubbles 24 of the prior art system 2, is drawn into the flow pattern. Also, the flow pattern improves the frequency of flow cycles per given time unit of operation with air injection. In addition, increased interface between standing wastewater 12 and the rising air 24 causes more vigorous turbulence, thus promoting more effective mechanical disintegration of suspended solids 14; oxygenates the wastewater 12 more effectively; and helps form the novel wastewater flow pattern described and illustrated. A given volume of air is thus forced to do more work in the septic system 100 of the present invention than the same volume if used in the prior art system 2. The effectiveness of the invention is such that no scum blanket 42 is formed, as is shown by Hansel to occur in the prior art system 2, seen in FIG. 6.

Figure 5:
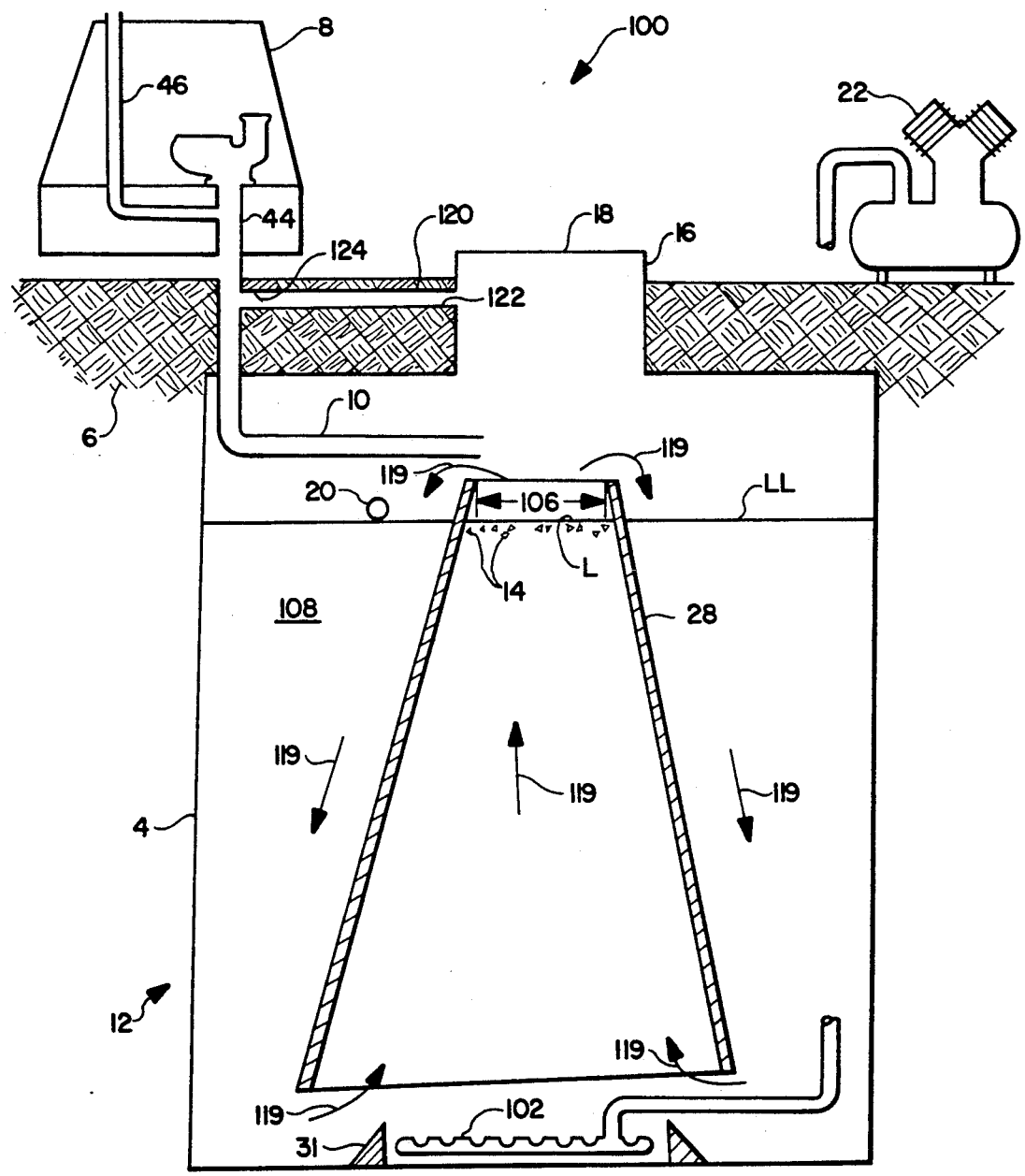
FIG. 5 is a cross sectional side view of an alternative embodiment of the present invention under static conditions.

Although the above flow pattern is described in detail and illustrated, it is contemplated within the scope of the present invention to utilize an alternative embodiment retaining a cyclic flow pattern while reversing the direction of flow. In this 1 embodiment, as illustrated in FIG. 5, the separator 28 is inverted, so as to concentrate the rising air 24 at the narrowest point therein. The air header 102 is reduced in diameter, and, of course, need not be annular. The wastewater line 10 is extended to discharge incoming residential waste into the middle of the separator 28, and the discharge line 20 is relocated exterior to the separator 28. Although the septic system 100 is illustrated in the dormant mode, upon injecting air, a flow pattern would result as indicated by arrows 119. As in the previous embodiment, air buoyancy raises the level L to overflow the separator 28. In this alternative embodiment, the narrowest point 106 of the rising air 24, formerly located at the top of the annulus 108, is now considered to exist at the top of the separator 28, now inverted with respect to the previous embodiment. Wastewater 12 descends in the annulus 108, and rises inside the separator 28. A flow director 31 is positioned outside the air header 102.

In a further improvement, spent air is collected and vented by a vent collector pipe 120 communicating with the wastewater line 10 by an ingress port 122 located at the tank projection 16 and an egress port 124, conducting vapors into the wastewater line 10. The wastewater line 10 originates at the residential waste piping system 44. Vent collector pipe 120 communicates with wastewater line 10 (at egress port 124) upstream, with respect to wastewater flow, of the end of the wastewater line 10 discharging wastewater into the tank 4. In current practice, at least one vent stack 46 is provided in each residential waste piping system 44, and this vent stack 46 is utilized to release spent air. Spent air and wastewater 12, which flow in opposite directions, can coexist since wastewater does not truly fill a typical wastewater pipe 48, as shown in FIG. 5. Air is thus allowed to pass to the vent stack 46 even in the presence of wastewater flowing oppositely.

This arrangement relieves pressure in the tank 4 which could otherwise force air and attendant objectionable odors out at ground level. Instead, this air is dissipated high in the air above the roof of the residence (not shown). Also, reduction of air pressure in the tank 4 may reduce the load on the air compressor 22.

It will be appreciated that the vent of the present invention adds only a short section of piping to the novel septic system 100, yet effectively removes odors frequently encountered at ground level with prior art septic systems 2.

The present invention is not to be limited to the embodiments described above, but encompasses any and all embodiments within the scope of the following claims.

I claim:

1. In a residential aerobic septic system for holding and treating wastewater containing solid waste, said septic system including a tank being buried in the ground near a residence, said tank having height, length, and width dimensions, a floor, upstanding walls, and a top wall substantially enclosing and sealing said tank, said top wall including means defining a projection of said tank, said projection having height, length, and width dimensions less than said dimensions of said tank, said tank top wall also having a removable cover, said tank containing separator means comprising a hollow, conical member having upper and lower open ends each having a diameter, said upper end diameter being greater than said lower end diameter, said separator means being suspended within said tank such that said open ends open upwardly and downwardly, said separator means defining an annulus existing between said separator walls and said tank upstanding walls, said separator means also dividing standing wastewater in said tank into a central volume contained within said separator conical member and a peripheral volume filling said annulus, flow director means comprising a cone disposed centrally upon said tank floor, a point of said cone oriented upwardly and being aligned with said separator open ends, said aerobic septic system further including an incoming wastewater line collecting and discharging the wastewater into said peripheral volume, said wastewater line including a residential building sewage vent stack open to the atmosphere, a discharge line drawing wastewater from said central volume, said discharge line having one end open to the interior of said separator and further being located above the level of one of said separator open ends and below the level of the other one of said separator open ends, whereby standing wastewater establishes a level below the level of one of said separator open ends and above the level of the other of said separator open ends, air vent means comprising a conduit terminating at ingress and egress ports communicating respectively with said tank projection and with said residential incoming wastewater line, said egress port being connected to said wastewater line upstream of discharge of said wastewater line into said tank, whereby said tank communicates with the open atmosphere by means of said vent stack open thereto, air supply means including air compressor means, air discharge header means, and conduit means conducting compressed air from said air compressor means and said discharge header means, said discharge header means discharging air around the entire periphery of said annulus, whereby substantially all wastewater of said peripheral volume is urged upwardly by air buoyancy, and whereby a water level existing above said annulus is raised by air buoyancy, thus causing wastewater to flow over a top of said separator, and whereby tank central volume wastewater is induced to flow downwardly, a constant water flow circuit within said tank thus being created upon injection of air by said air supply means, wherein water flows only upwardly in said annulus and only downwardly in said separator, .

whereby substantially all solid waste suspended in the wastewater is subjected to agitation and to oxygenation by intimate contact with air rising in said annulus.

2. In a residential aerobic septic system for holding and treating wastewater containing solid waste, said septic system including a tank being buried in the ground near a residence, said tank having height, length, and width dimensions, a floor, upstanding walls, and a top wall substantially enclosing and sealing said tank, said top wall including means defining a projection of said tank, said projection having height, length, and width dimensions less than said dimensions of said tank, said tank top wall also having a removable cover, said tank containing separator means comprising a hollow, conical member having upper and lower open ends each having a diameter, said upper end diameter being less than said lower end diameter, said separator means being suspended within said tank such that said open ends open upwardly and downwardly, said separator means defining an annulus existing between said separator walls and said tank upstanding walls, said separator means also dividing standing wastewater in said tank into a central volume contained within said separator conical member and a peripheral volume filling said annulus, flow director means comprising an upstanding wall defining a circular form having a diameter, said upstanding wall having canted outer wall surfaces disposed centrally upon said tank floor, said upstanding wall being aligned with said separator open ends, said upstanding wall diameter being less than said separator lower end diameter, said aerobic septic system further including an incoming wastewater line collecting and discharging the wastewater into said central volume, said wastewater line including a residential building sewage vent stack open to the atmosphere, a discharge line drawing wastewater from said peripheral volume, said discharge line having one end open to said tank exteriorly of said separator and further being located above the level of one of said separator open ends and below the level of the other one of said separator open ends, whereby standing wastewater establishes a level below the level of one of said separator open ends and above the level of the other of said separator open ends, air vent means comprising a conduit terminating at ingress and egress ports communicating respectively with said tank projection and with said residential incoming wastewater line, said egress port being connected to said wastewater line upstream of discharge of said wastewater line into said tank, whereby said tank communicates with the open atmosphere by means of said vent stack open thereto, air supply means including air compressor means, air discharge header means, and conduit means conducting compressed air from said air compressor means and said discharge header means, said discharge header means discharging air around the entire periphery of said separator lower end, whereby substantially all wastewater of said central volume is urged upwardly by air buoyancy, and whereby a water level existing above said separator is raised by air buoyancy, thus causing wastewater to flow over a top of said separator, and whereby tank peripheral volume wastewater is induced to flow downwardly, a constant water flow circuit within said tank thus being created upon injection of air by said air supply means, wherein water flows only upwardly in said separator and only downwardly in said annulus, whereby substantially all solid waste suspended in the wastewater is subjected to agitation and to oxygenation by intimate contact with air rising in said separator.

* * * * *